(12) United States Patent
James et al.

(10) Patent No.: US 11,087,740 B2
(45) Date of Patent: Aug. 10, 2021

(54) SYSTEMS AND METHODS FOR TRAINING A CONTROL SYSTEM BASED ON PRIOR AUDIO INPUTS

(71) Applicant: Rovi Guides, Inc., San Jose, CA (US)

(72) Inventors: Bryan James, Davis, CA (US); Manik Malhotra, Durham, NC (US)

(73) Assignee: Rovi Guides, Inc., San Jose, CA (US)

( * ) Notice: Subject to any disclaimer, the term of this patent is extended or adjusted under 35 U.S.C. 154(b) by 433 days.

(21) Appl. No.: 16/201,679

(22) Filed: Nov. 27, 2018

(65) Prior Publication Data

US 2020/0168206 A1    May 28, 2020

(51) Int. Cl.
| | |
|---|---|
| G10L 15/00 | (2013.01) |
| G10L 15/06 | (2013.01) |
| G10L 15/18 | (2013.01) |
| G10L 15/22 | (2006.01) |
| G10L 15/02 | (2006.01) |

(52) U.S. Cl.
CPC ........ G10L 15/063 (2013.01); G10L 15/1815 (2013.01); G10L 15/1822 (2013.01); G10L 15/22 (2013.01); G10L 15/02 (2013.01); G10L 2015/223 (2013.01)

(58) Field of Classification Search
CPC combination set(s) only.
See application file for complete search history.

(56) References Cited

U.S. PATENT DOCUMENTS

| | | |
|---|---|---|
| 8,326,637 B2 | 12/2012 | Baldwin et al. |
| 9,484,030 B1 | 11/2016 | Meaney |
| 9,570,070 B2 | 2/2017 | Baldwin et al. |
| 2018/0228006 A1 | 8/2018 | Baker |

OTHER PUBLICATIONS

PCT International Search Report for International Application No. PCT/US2019/062496, dated Apr. 29, 2020 (14 pages).

*Primary Examiner* — Vu B Hang
(74) *Attorney, Agent, or Firm* — Haley Guiliano LLP

(57) ABSTRACT

Systems and methods are disclosed herein for training a control system based on prior audio inputs. The disclosed systems and methods receive a non-lexical or interjectional audio input. State change indications are also received and stored by the system within a predefined period of time starting from the time the system received the audio input. The system then receives a subsequent audio input. If the audio inputs of both the audio input and the subsequent audio input match, and contextual information for the audio input and the subsequent audio input match, the system stores a match association, comprising a confidence factor, for the subsequent audio input to the audio input in the associative data structure. If the confidence factor is greater than a preconfigured confidence level, the system executes one or more functions based on stored state change indications.

20 Claims, 8 Drawing Sheets

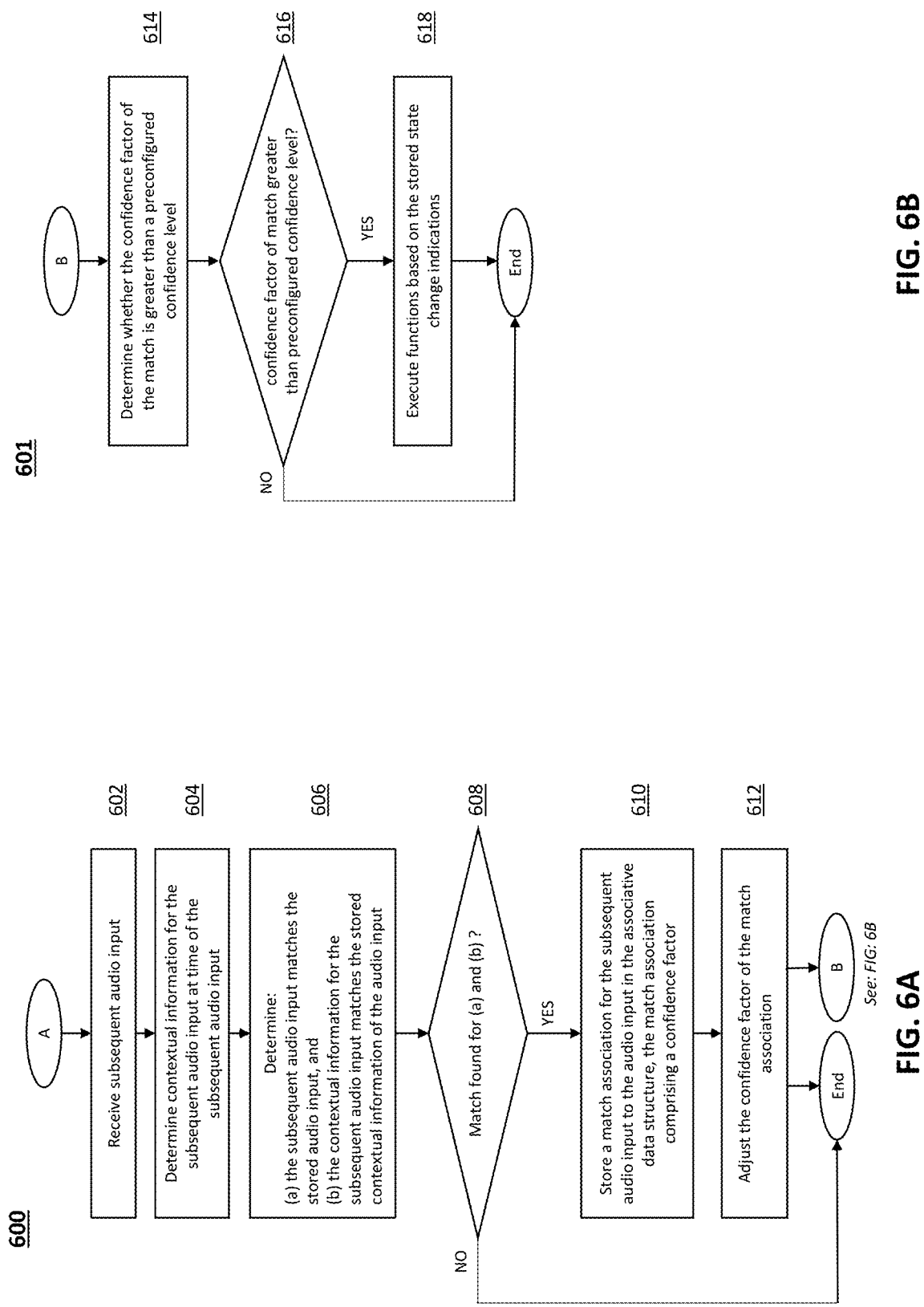

SYSTEMS AND METHODS FOR TRAINING A CONTROL SYSTEM BASED ON PRIOR AUDIO INPUTS

BACKGROUND

The present disclosure is directed to techniques for associating state changes with audio inputs and, more particularly, to training a control system based on prior non-lexical or interjectional audio inputs.

SUMMARY

Conventional approaches for training control systems are based on known voice commands for executing programmable functions. In these conventional approaches the known voice command must be associated by the control system with executable functions. However, training a control system based on a detected utterance that is non-lexical or interjectional (e.g., a non-known voice command) remains technically challenging, as conventional approaches cannot associate the non-lexical or interjectional utterance to a specific executable function.

Accordingly, systems and methods are disclosed herein for training a control system based on prior non-lexical or interjectional audio inputs. The disclosed systems and methods receive a non-lexical or interjectional audio input. State change indications are also received by the system within a predefined period of time starting from the time the system received the audio input. The predefined period of time is utilized by the system such that only state change indications that are received within this period are stored in the associative data structure. The system determines contextual information for the audio input using control circuitry. The system then stores the audio input, the contextual information, and the one or more state change indications in an associative data structure in a memory.

A subsequent audio input, that is also non-lexical or interjectional, may be received by the system and contextual information of the subsequent audio input is determined. The system then determines if the audio inputs of both the audio input and the subsequent audio input match, and whether the contextual information for the audio input and the subsequent audio input match. If so, the system stores a match association for the subsequent audio input to the audio input in the associative data structure.

In some embodiments disclosed herein, the match association may have a confidence factor. The confidence factor may be adjusted or scaled. For example, the system may determine whether the confidence factor is greater than a preconfigured confidence level. If so, functions are executed based on stored state change indications. In another disclosed approach, statistical information associated with the match association is determined. The system then calculates the confidence factor by applying a mathematical operation to a previous confidence factor, where the mathematical operation uses the statistical information.

A number of techniques for determining contextual information for the subsequent audio input are disclosed herein. For example, the audio input may be parsed into components. The components are then compared to an audio signal profile to see if any of the components match the audio signal profile. If so, the audio signal profile, which includes contextual information, is assigned to the contextual information for the audio input. In another disclosed approach, the audio input includes metadata that contains contextual information. The system assigns this contextual information from the metadata to the audio input. In yet another disclosed approach, the system receives contextual information associated with the audio input from a contextual data structure. The system then assigns the received contextual information as the contextual information for the audio input.

In some variants, the system may determine whether the audio input is a non-lexical sound or an interjection by comparing the received audio input to a lexical sound data structure to determine if the audio input matches one of a plurality of lexical sounds. If not, the system determines that the received audio input is a non-lexical sound or an interjection.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which:

FIG. 6A is an illustrative flowchart of a process for adjusting the confidence factor of the match association, in accordance with some embodiments of the disclosure;

FIG. 6B is an illustrative flowchart of a process for executing functions based on the stored state change indications, in accordance with some embodiments of the disclosure;

DETAILED DESCRIPTION

Figure 1A:
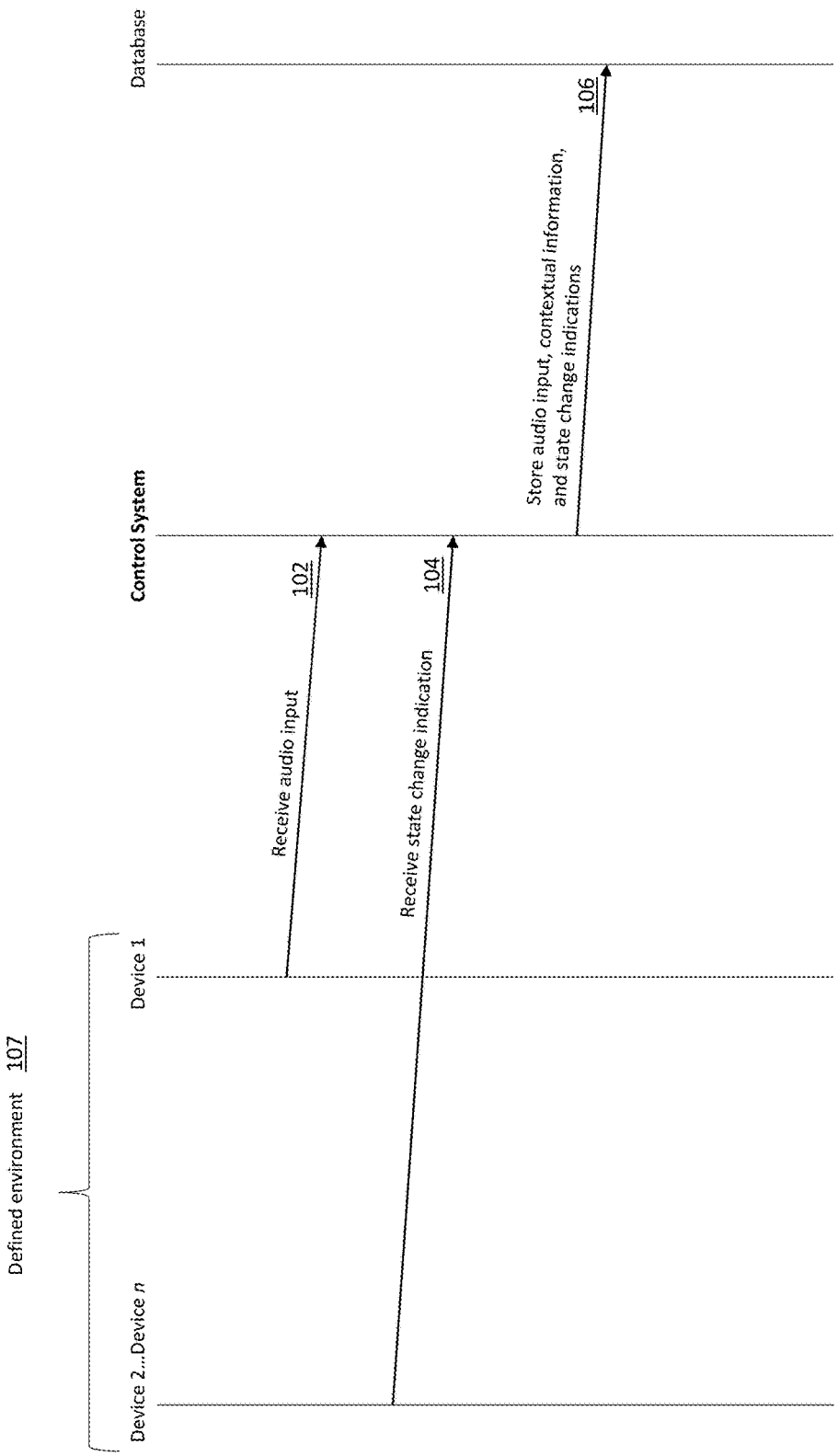
FIG. 1A shows an illustrative diagram of a control system interacting with databases and devices, in accordance with some embodiments of the disclosure.

FIG. 1A shows an illustrative diagram 100 of a control system interacting with databases and devices, in accordance with some embodiments of the disclosure. A control system, within a defined environment of devices 107, may receive an audio input 102 from a first device. The system receives state change information 104 from one or more devices. The control system then stores the audio input, contextual information and state change indications in an associative data structure 106.

The defined environment may be a residence, workplace, hospital, outdoor area, traffic intersection, classroom, factory, manufacturing facility, aquatic facility, college campus, security facility, public work space, hotel, event space, city square, public park, enclosed environment, open environment, conference center, retail center or other public or private location.

Example devices may include microphones, cameras, sensors, computers, medical equipment, office equipment, point-of-sale equipment, lighting, speakers, displays, communications equipment, security equipment, appliances, automated machinery, vehicles, or similar devices.

The non-lexical audio inputs may be door closing/opening, clicking, creaking, motor sounds, road noise, whirring, squeaking, rumbling, coughs, sneezes, whimpers, breathing patterns, snaps, crackles, footsteps, bodily auditory patterns, engine noises, distress signals, tones, sighing, dragging, scuffling, shuffling, rustling, tapping, knocking, water or air flow, grinding, spraying, or similar audio inputs.

Interjectional audio input may be a spontaneous utterance which may lack grammatical connection. The interjectional audio input may be lexical or non-lexical.

The control system may be trained over time to monitor state-changes in a defined environment based on non-lexical or interjectional audio inputs and contextual information of the associated state changes that result. For example, the sound of water flowing under a given set of contextual circumstances resulting in closing a valve, would lead to the control system automatically closing the valve when the audio signal and contextual circumstances yield a high-confidence match with an associated data structure.

Figure 1B:
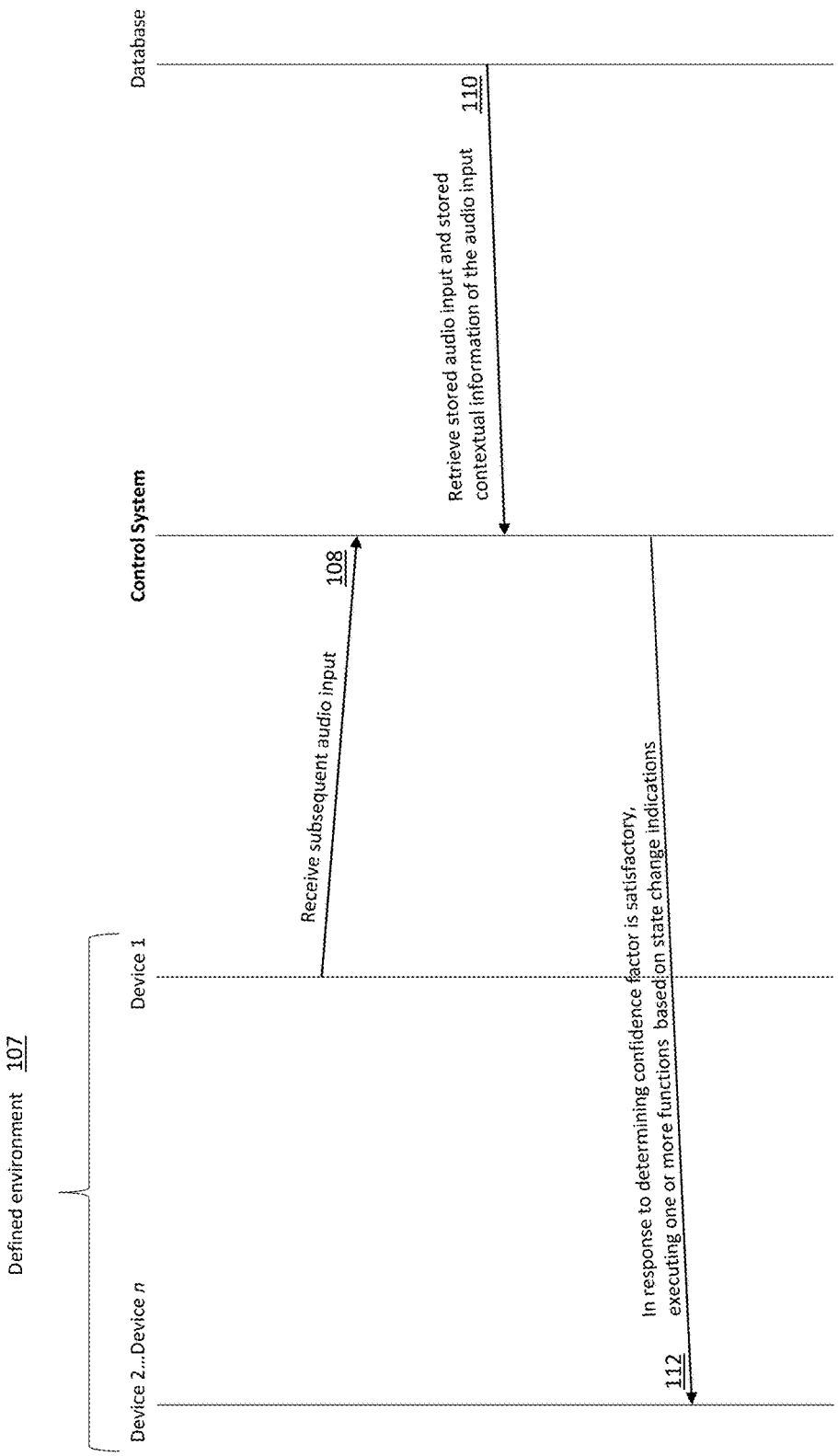
FIG. 1B shows an illustrative data flow diagram of the control system receiving subsequent audio inputs and executing functions based on state change indications, in accordance with some embodiments of the disclosure.

FIG. 1B continues from FIG. 1A by illustrative diagram 101 showing a control system receiving subsequent audio inputs and executing functions based on state change indications, in accordance with some embodiments of the disclosure. The control system may receive a subsequent audio input at a later time after the audio input is received 108. For example, a subsequent audio input is detected at approximately the same time the following day. The control system retrieves the contextual information regarding the subsequent audio input. Contextual information may include any information related to the defined environment, or related to devices within the defined environment at, or approximately close to, the time of a state-change of a device in the defined environment. Contextual information may include, but is not limited to, the specific day, time of day, currently running applications, number of people present within the defined environment, system status, weather, temperature, humidity, season, quantities, procedural steps in a process, data access and the type of data being accessed, age, functionality, power consumption, pressure, weight, or similar metrics. The control system then retrieves stored audio input of the first audio input and corresponding contextual information 110. The control system determines if the current audio input interjection matches the first audio input interjection. The control system determines a match when the audio inputs are of the same audio signature and it appears the audio inputs are matching. The control system further determines whether the contextual information for both audio inputs are similar and constitute a match. In some embodiments, matching may require a similarity comparison to a matching threshold, where if the matching threshold is exceeded, the inputs are considered matched. In other embodiments, a match is deemed when specific key information exists within both inputs, or parsed versions of the input. Because both the audio inputs are matching, and corresponding respective contextual information are matching, a match association between both audio inputs is stored in the associative data structure. The match association also includes a confidence factor of the match based on the similarity of the match, which is also stored in the associative data structure. The control system determines whether this confidence factor is greater than a preconfigured confidence factor. If so, the control system executes a function 112 based on the state change.

The control system applies the predefined period of time starting from receipt of the audio in various implementations. Upon receipt of the audio input, the control system executes a timer based on a predefined period of time. In some embodiments, the predefined period of time may be preconfigured by the system as a static value. In some embodiments, the predefined period of time may be dynamically adjusted based on various environmental factors and/or historical contextual information of the control system. In some embodiments, if no state change indication is detected within the predefined period of time, the system times out and will revert back to the receiving a new audio input and restart the system/method. Thus, a loop implementation of the current technique may be implemented on the control system with a time-out functionality to the predefined time period.

The execution of the one or more functions by the control system may be implemented using various approaches. In some embodiments, when the control system executes one or more functions, the functions include one or more confirmatory functions. For example, the control system may request confirmation of execution of a specific function. The control system may receive a selection of a confirmatory function, and store the confirmatory function, the subsequent audio input, and the contextual information for the subsequent audio input in the associative data structure in the memory.

In other embodiments, execution of the one or more functions may include transmitting an instruction to a network-connected device within the defined network. The instruction may be based on the stored one or more state change indications. The environment may include one or more connected devices, or Internet-of-Things device, or a similar wirelessly connected device which is communicatively coupled to the control system. The control system may then store the one or more functions of the network-connected device, the subsequent audio input, and the contextual information for the subsequent audio input in the associative data structure in the memory.

Determining the contextual information may be implemented using various approaches. In some embodiments, the control system parses the audio input into one or more audio components. Various parsing techniques may be used to parse the audio input into various components. The control system compares each component, of the one or more audio components, to a plurality of audio signal profiles. The audio signal profiles may include the corresponding contextual information. The control system determines whether one of the one or more components matches one of the plurality of audio signal profiles. In a positive determination, the control system assigns the corresponding contextual information of the matching audio signal profile to the contextual information of the audio input. An audio signal profile may be any audio signal, or audio signal component, which has corresponding contextual data. In some embodiments, audio signal profiles are stored in a database for retrieval for comparison to received audio and subsequent audio inputs.

In other embodiments, the audio input further comprises metadata including corresponding contextual information of the audio input. For example, the audio input may be received by digital packets, and within the digital transmission there may be additional metadata in the header, or within any other segment, of the digital packet relating to the details of the audio input. The control system may assign the corresponding contextual information of the audio input (e.g., the contextual information found in the metadata) as the contextual information for the audio input.

Some variants of the system provide for the control system receiving contextual information associated with the audio input from a contextual data structure. For example, various databases containing corresponding contextual information to the audio input may be interfaced with to retrieve the corresponding contextual information. The control system may assign the corresponding contextual information of the audio input (e.g., the contextual information found in the database) as the contextual information for the audio input. In some embodiments, the database may be a part of the control system. In some embodiments, the database may be a cloud-based database communicatively coupled to the control system.

The control system may adjust the confidence factor of the match association based on finding a match. For example, if the subsequent audio input matches the stored audio input and the contextual information for the subsequent audio input matches the stored contextual information of the audio input, the control system may adjust the confidence factor to provide an indication to the system that the match for this particular audio input has been seen previously and it has matched many times without false association. The adjustment to the confidence factor may take many forms. In some embodiments, the adjustment may be an incremental adjustment made to the previous confidence factor each time a match association is made. In some embodiments, statistical information associated with the match information may be used to calculate the amount of incrementation. For example, the number of times this match association has occurred within a month can be taken into consideration when determining the amount of incrementation. The control system may calculate the confidence factor by applying a mathematical operation to a previous confidence factor associated with the match association, wherein the mathematical operation utilizes the statistical information of the match association.

In some embodiments, the control system may determine whether the audio input is a non-lexical sound or an interjection. The control system first compares the received audio input to a lexical sound data structure. The lexical sound data structure may be populated or pre-trained with various dictionaries to include all variants of known lexical sounds used in proper language and/or colloquial language. The control system determines if the audio input matches one of a plurality of lexical sounds within the lexical sound data structure. If there is no match, the control system determines that that the received audio input is a non-lexical sound or an interjection.

Figure 2:
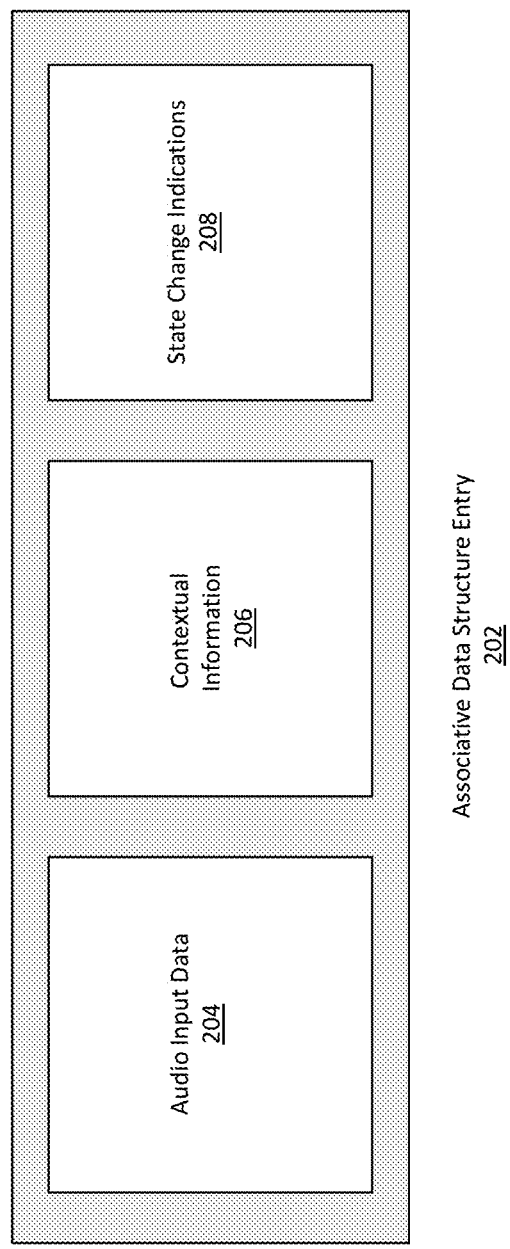
FIG. 2 shows an illustrative diagram of an associative data structure entry, in accordance with some embodiments of the disclosure.

FIG. 2 shows an illustrative diagram 200 of an associative data structure entry 202, in accordance with some embodiments of the disclosure. The associative data structure entry includes audio input data 204. The audio input data may be in any data format. The associative data structure also includes contextual information 206. The contextual information may be received from a number of sources and is associated by the control system with the audio input data. The associative data structure entry includes state change indications 208 associated with the audio input data. The associative data structure may be of any data structure type that provides for an entry to associate the contextual information and state change information with an audio input data.

Figure 3:
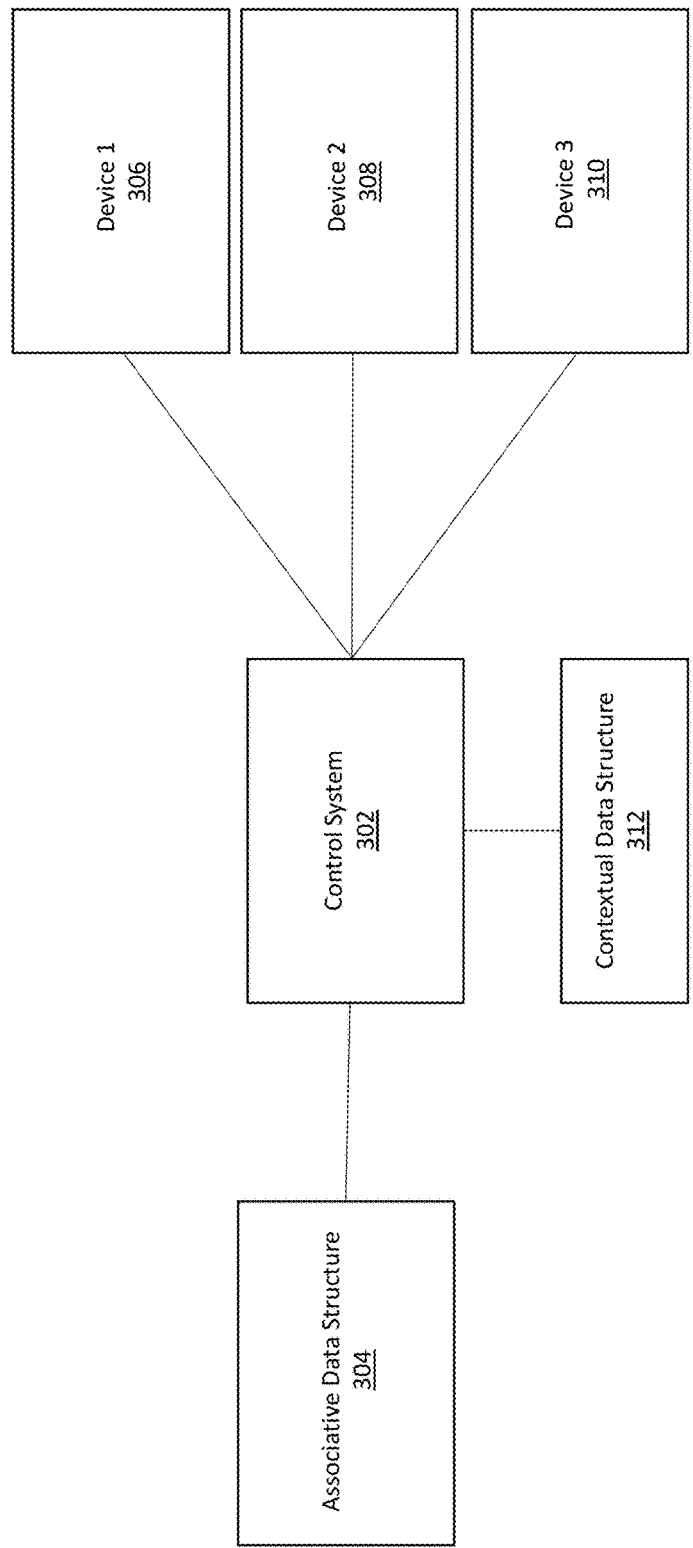
FIG. 3 shows an illustrative system diagram of the control system, associative data structure, contextual data structure, and multiple devices, in accordance with some embodiments of the disclosure.
Figure 4:
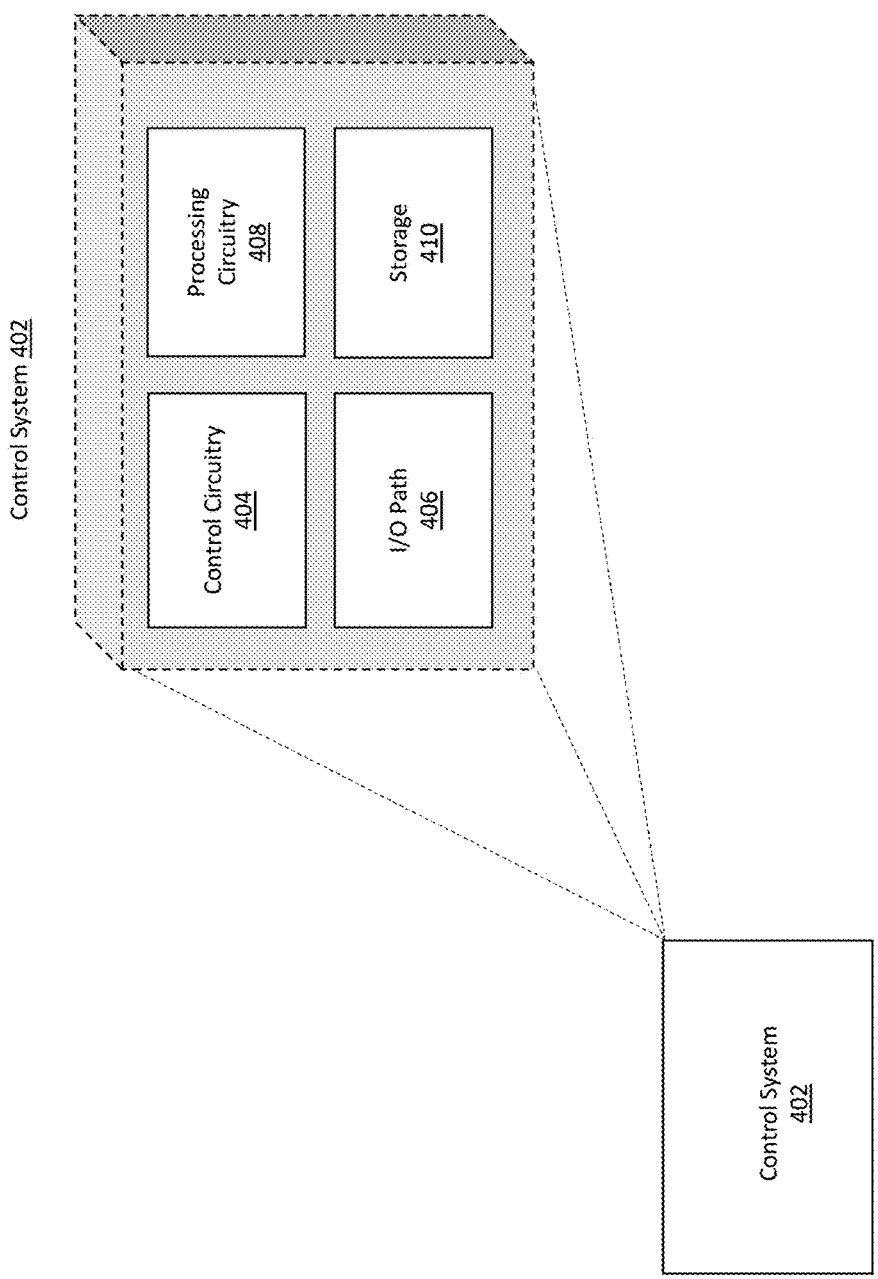
FIG. 4 shows an illustrative block diagram of the control system, in accordance with some embodiments of the disclosure.

FIG. 3 shows an illustrative system diagram 300 of the control system, associative data structure, contextual data structure, and multiple devices, in accordance with some embodiments of the disclosure. The control system 302 may be of any hardware that provides for the functionality of the disclosed techniques for training a control system based on prior non-lexical or interjectional audio inputs. The control system may be communicatively coupled to multiple devices in a defined environment (e.g., device 1 (306), device 2 (308), device 3 (310), device n). The control system may be communicatively coupled to an associative data structure 304. In some embodiments, the control system is communicatively coupled to a contextual data structure. A further detailed disclosure on the control system can be seen in FIG. 4 showing an illustrative block diagram of the control system, in accordance with some embodiments of the disclosure.

In some embodiments, the control system may be embedded within a device within the defined environment having shared hardware of the device. For example, in a security system which implements an Internet-of-Things (IoT) camera system, the control system may be part of the hardware of the camera rather than distinct hardware. In other variants, the IoT camera would be communicatively coupled (e.g., by Bluetooth or Wi-Fi) to a computing unit functioning as the control system. Any of the system modules (e.g., control system, contextual data structure, associative data structure, devices) may be any combination of shared or disparate hardware pieces that are communicatively coupled.

The devices in the defined environment (e.g., device 1 (306), device 2 (308), device 3 (310), device n) may be any device that have state change properties. For example, the device may be any processor-based system, electronic device, sensor, state machine, retrofit network-connected device with state detection. In various systems, devices can include, but are not limited to, network-connected devices (e.g., Internet-of-Things devices), smartphones, personal computers, smart appliances, consumer electronics, industrial equipment, security systems, digital twin systems, and similar system. The state change of the device is detected by the control system through a communication means (e.g., network connection, Bluetooth, hardwire, electric wire, phone cable, or any other communicative means).

The associative data structure 304 may be any database, server, computing device that contains memory for storing entries to associate the contextual information and state change information with an audio input data.

The contextual data structure 312 may be any database, server, or computing device that contains memory for storing contextual information associated with state changes of devices within a defined environment. In some embodiments, the contextual data structure is a module of the control system.

FIG. 4 shows an illustrative block diagram 400 of the control system 402, in accordance with some embodiments of the disclosure. In some embodiments, the control system may be communicatively connected to a user interface. In some embodiments, the control system may include processing circuitry, control circuitry, and storage (e.g., RAM, ROM, hard disk, removable disk, etc.). The control system may include an input/output path 406. I/O path 406 may provide device information, or other data over a local area network (LAN) or wide area network (WAN), and/or other content and data to control circuitry 404, which includes processing circuitry 408 and storage 410. Control circuitry 404 may be used to send and receive commands, requests, and other suitable data using I/O path 406. I/O path 406 may connect control circuitry 404 (and specifically processing circuitry 408) to one or more communications paths.

Control circuitry 404 may be based on any suitable processing circuitry such as processing circuitry 408. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a control system stored in memory (e.g., storage 410).

Memory may be an electronic storage device provided as storage 410 which is part of control circuitry 404. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions).

The control system 402 may be coupled to a communications network. Communications network may be one or more networks including the Internet, a mobile phone network, mobile voice or data network (e.g., a 5G, 4G or LTE network), mesh network, peer-2-peer network, cable network, or other types of communications network or combinations of communications networks. Paths may separately or together include one or more communications paths, such as, a satellite path, a fiber-optic path, a cable path, a path that supports Internet communications, free-space connections (e.g., for broadcast or other wireless signals), or any other suitable wired or wireless communications path or combination of such paths.

Figure 5:
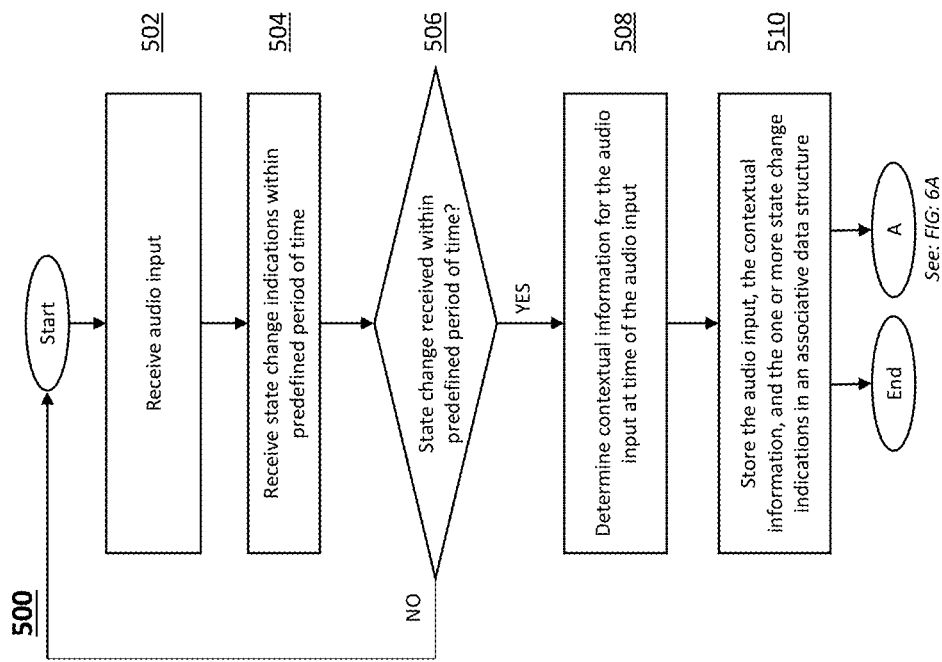
FIG. 5 is an illustrative flowchart of a process for training a control system based on prior non-lexical or interjectional audio inputs, in accordance with some embodiments of the disclosure.

FIG. 5 is an illustrative flowchart of a process for training a control system based on prior non-lexical or interjectional audio inputs, in accordance with some embodiments of the disclosure. Process 500, and any of the following processes, may be executed by control circuitry 404 (e.g., in a manner instructed to control circuitry 404 by the control system). Control circuitry 404 may be part of control system 402, or of a remote server separated from the control system by way of a communication network, or distributed over a combination of both.

At 502, the control system, by control circuitry 404, receives an audio input. The audio input includes a non-lexical sound or an interjection. The control system may receive the audio input through the I/O path 406 which may be coupled to another device, or an audio sensor to detect and receive the audio input. At 504, the control system, by control circuitry 404, receives one or more state change indications within a predefined period of time starting from the receipt of the audio input. The state changes may be received by the control system through the I/O path 406 which may detect a state change from a device in the defined environment. In some embodiments, the control circuitry 404 receives data regarding a state change from a device within the defined environment. At 506, control circuitry 404 determines whether the one or more state change indications are received within a predefined period of time. Control circuitry 404, may implement a timer upon receipt of the audio input to determine the current time and compare against the predefined period of time. The predefined period of time may be stored in storage 410 of the control system 402. If, at 506, control circuitry 404 determines "No," the one or more state change indications are not received within a predefined period of time, the process reverts to Start.

If, at 506, control circuitry determines "Yes," the one or more state change indications are received within a predefined period of time, the process advances to 508. At 508, control circuitry 404 determines the contextual information for the audio input at the time of the audio input. In some embodiments, the determination of the contextual information for the audio input may be retrieved from storage 410. In other variants, the contextual information of the audio input is received from a contextual information database received through the I/O path 406 of the control system 402. In other embodiments, the control system determines the contextual information based on data related to the audio input using processing circuitry 408.

At 510, the control system, by control circuitry 404, stores the audio input, the contextual information, and the one or more state change indications in an associative data structure in a memory. In some embodiments, the associative data structure may be part of the control system 402 in storage 410. In other embodiments, the control system 402 provides instructions for storage to the associative data structure through an I/O path 406.

FIG. 6A is an illustrative flowchart of a process 600 for adjusting the confidence factor of the match association, in accordance with some embodiments of the disclosure. At 602, the control system receives, by control circuitry 404, a subsequent audio input. The subsequent audio input comprises a non-lexical sound or an interjection. The control system may receive the subsequent audio input through the I/O path 406, which may be coupled to another device, or an audio sensor to detect and receive the audio input.

At 604, control circuitry 404 determines the contextual information for the subsequent audio input at the time of the subsequent audio input. In some embodiments, the determination of the contextual information for the subsequent audio input may be retrieved from storage 410. In other variants, the contextual information of the subsequent audio input is received from a contextual information database received through the I/O path 406 of the control system 402. In other embodiments, the control system determines the contextual information based on data related to the subsequent audio input using processing circuitry 408.

At 606, control circuitry 404 determines whether the subsequent audio input matches the stored audio input, and whether the contextual information for the subsequent audio input matches the stored contextual information of the audio input. The matching may be calculated by processing circuitry 408. If, at 608, control circuitry 404 determines "No," the subsequent audio input does not match the stored audio input, or the contextual information for the subsequent audio input does not match the stored contextual information of the audio input, the process advances to "End."

If, at 608, control circuitry determines "Yes," the subsequent audio input matches the stored audio input, and the contextual information for the subsequent audio input matches the stored contextual information of the audio input, the process advances to 610. At 610, control circuitry 404 stores a match association for the subsequent audio input to the audio input in the associative data structure, wherein the match association comprises a confidence factor of the match association. In some embodiments, the match association is stored within the associative data structure, which may be part of the control system 402 in storage 410. In other embodiments, the control system 402 provides instructions for storage of the match association to the associative data structure through an I/O path 406.

At 612, control circuitry 404 adjusts the confidence factor of the match association. The adjustment of the confidence factor may involve determining statistical information associated with the match association. Processing circuitry 408 may be used to help adjust the confidence factor for the match association. In some embodiments, after step 612 the process advances to "End." In other embodiments, after step 612 the process advances to 614.

FIG. 6B is an illustrative flowchart of a process for executing functions based on the stored state change indications, in accordance with some embodiments of the disclosure. At 614, the control system determines, by control circuitry 404, whether the confidence factor of the match is greater than a preconfigured confidence level. If, at 616, control circuitry 404 determines "No," the confidence factor of the match is not greater than the preconfigured confidence level, the process advances to "End."

If, at 616, control circuitry determines "Yes," the confidence factor of the match is greater than the preconfigured confidence level, the process advances to 618. At 618, control circuitry 404 executes one or more functions based on the stored one or more state change indications. The one of more functions may be executed through the I/O path 406 of the control system 402. In some embodiments, the execution requires the functions to be executed on a network-connected device for which execution instructions are sent from the control system through the I/O path 406. In some embodiments, the stored state change indications may be part of the control system 402 in storage 410. In other embodiments, the control system 402 may retrieve the stored state change indications from the associative data structure through an I/O path 406.

Figure 7:
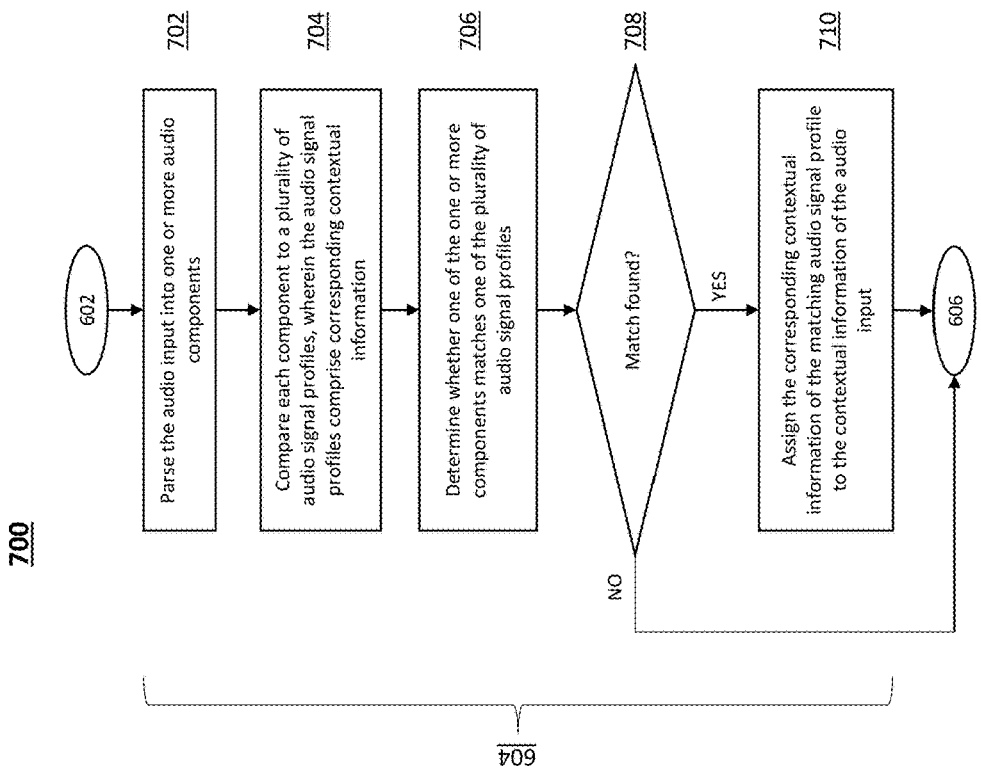
FIG. 7 is an illustrative flowchart of a process for assigning the corresponding contextual information of the matching audio signal profile to the contextual information of the audio input, in accordance with some embodiments of the disclosure.

FIG. 7 is an illustrative flowchart of a process 700 for assigning the corresponding contextual information of the matching audio signal profile to the contextual information of the audio input, in accordance with some embodiments of the disclosure. At 702, control circuitry 404 parses the audio input into one or more audio components. Processing circuitry 408 may be implemented to parse the audio input.

At 704, control circuitry 404 compares each component, of the one or more audio components, to a plurality of audio signal profiles. The audio signal profiles comprise corresponding contextual information the audio input into one or more audio components. In some embodiments, the control system may retrieve the audio signal profiles from the associative data structure. In other variants, the control system may retrieve the audio signal profiles from storage 410.

At 706, the control system determines, by control circuitry 404, whether one of the one or more components matches one of the plurality of audio signal profiles. If, at 708, control circuitry 404 determines "No," the one of the one or more components does not match one of the plurality of audio signal profiles, the process advances to 606.

If, at 708, control circuitry determines "Yes," the one of the one or more components matches one of the plurality of audio signal profiles, the process advances to 710. At 710, control circuitry 404 assigns the corresponding contextual information of the matching audio signal profile to the contextual information of the audio input.

Figure 8:
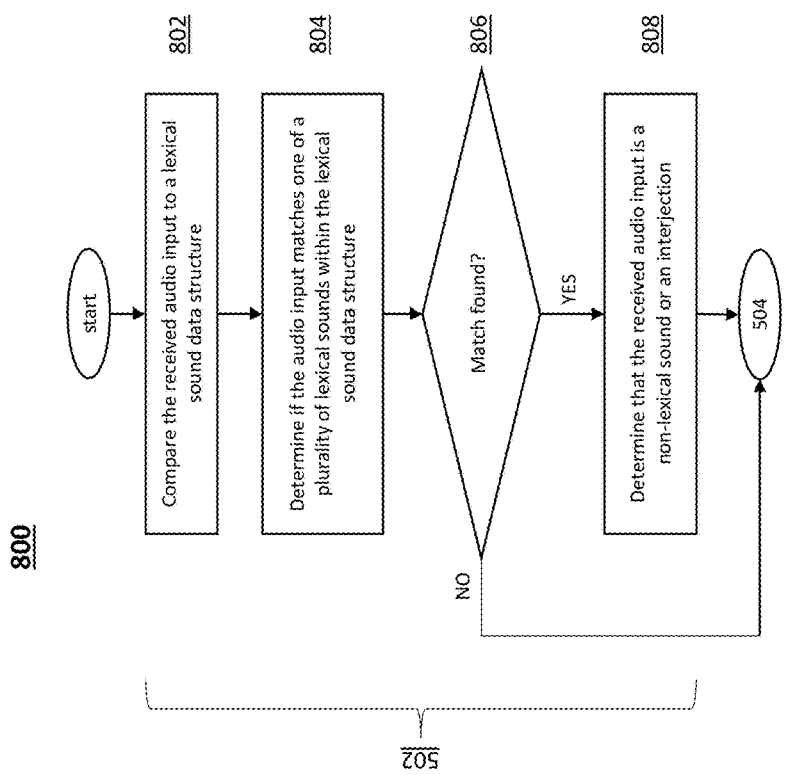
FIG. 8 is an illustrative flowchart of a process for determining that the received audio input is a non-lexical sound or an interjection, in accordance with some embodiments of the disclosure.

FIG. 8 is an illustrative flowchart of a process for determining that the received audio input is a non-lexical sound or an interjection, in accordance with some embodiments of the disclosure. At 802, control circuitry 404 compares the received audio input to a lexical sound data structure. Processing circuitry 408 may be implemented to compare the received audio to the lexical sound data structure. The control system may communicate via the I/O path 406 to the lexical sound data structure. In some embodiments, the lexical sound data structure is integrated within the control system, specifically in storage 410.

At 804, the control system determines, by control circuitry 404, whether the audio input matches one of a plurality of lexical sounds within the lexical sound data structure. If, at 806, control circuitry 404 determines "No," the audio input does not match one of the plurality of lexical sounds within the lexical sound data structure, the process advances to 504.

If, at 806, control circuitry determines "Yes," the audio input matches one of the plurality of lexical sounds within the lexical sound data structure, the process advances to 808. At 808, control circuitry 404 determines that the received audio input is a non-lexical sound or an interjection.

It is contemplated that the steps or descriptions of FIGS. 5-8 may be used with any other embodiment of this disclosure. In addition, the steps and descriptions described in relation to FIGS. 5-8 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 3-4 could be used to perform one or more of the steps in FIGS. 5-8.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for training a control system based on prior audio inputs, the method comprising:

receiving, by control circuitry, an audio input, wherein the audio input comprises a non-lexical sound or an interjection;

receiving, by the control circuitry, one or more state change indications within a predefined period of time starting from the receipt of the audio input; and in response to receiving one or more state change indications within the predefined period of time:

determining, by the control circuitry, contextual information for the audio input at the time of the audio input; and storing, by the control circuitry, the audio input, the contextual information, and the one or more state change indications in an associative data structure in a memory.

2. The method of claim 1 further comprising:

receiving, by the control circuitry, a subsequent audio input, wherein the subsequent audio input comprises a non-lexical sound or an interjection;

determining, by the control circuitry, contextual information for the subsequent audio input at the time of the subsequent audio input; and in response to determining, by the control circuitry, (a) the subsequent audio input matches the stored audio input and (b) the contextual information for the subsequent audio input matches the stored contextual information of the audio input:

storing, by the control circuitry, a match association for the subsequent audio input to the audio input in the associative data structure, wherein the match association comprises a confidence factor of the match association; and adjusting, by the control circuitry, the confidence factor of the match association.

3. The method of claim 2, wherein in response to determining, by the control circuitry, (a) the subsequent audio input matches the stored audio input and (b) the contextual information for the subsequent audio input matches the stored contextual information of the audio input, further comprises:

determining, by the control circuitry, whether the confidence factor of the match is greater than a preconfigured confidence level; and in response to determining the confidence factor of the match is greater than a preconfigured confidence level, executing, by the control circuitry, one or more functions based on the stored one or more state change indications.

4. The method of claim 3, wherein:

executing, by the control circuitry, one or more functions comprises providing a confirmatory function;

and the method further comprises:

receiving, by the control circuitry, a selection of the confirmatory function; and storing, by the control circuitry, the confirmatory function, the subsequent audio input, and the contextual information for the subsequent audio input in the associative data structure in the memory.

5. The method of claim 3, wherein:

executing, by the control circuitry, one or more functions comprises transmitting an instruction to a network-connected device, the instruction based on the stored one or more state change indications;

and the method further comprises storing, by the control circuitry, the one or more functions, the subsequent audio input, and the contextual information for the subsequent audio input in the associative data structure in the memory.

6. The method of claim 1, wherein determining, by the control circuitry, contextual information for the audio input, further comprises:

parsing, by the control circuitry, the audio input into one or more audio components;

comparing, by the control circuitry, each component, of the one or more audio components, to a plurality of audio signal profiles, wherein the audio signal profiles comprise corresponding contextual information;

determining, by the control circuitry, whether one of the one or more components matches one of the plurality of audio signal profiles; and in response to the determination that one of the one or more components matches one of the plurality of audio signal profiles, assigning, by the control circuitry, the corresponding contextual information of the matching audio signal profile to the contextual information of the audio input.

7. The method of claim 1, wherein:

the audio input further comprises metadata including corresponding contextual information of the audio input; and determining, by the control circuitry, contextual information for the audio input further comprises assigning the corresponding contextual information of the audio input as the contextual information for the audio input.

8. The method of claim 1, wherein determining, by the control circuitry, contextual information for the audio input further comprises:

receiving, by the control circuitry, contextual information associated with the audio input from a contextual data structure; and assigning, by the control circuitry, the received contextual information to the audio input as the contextual information for the audio input.

9. The method of claim 2, wherein adjusting, by the control circuitry, the confidence factor of the match association further comprises:

determining, by the control circuitry, statistical information associated with the match association; and calculating, by the control circuitry, the confidence factor by applying a mathematical operation to a previous confidence factor associated with the match association, wherein the mathematical operation utilizes the statistical information of the match association.

10. The method of claim 1 wherein receiving, by control circuitry, an audio input, wherein the audio input comprises a non-lexical sound or an interjection further comprises:

determining whether the audio input is a non-lexical sound or an interjection by:

comparing, by the control circuitry, the received audio input to a lexical sound data structure;

determining, by the control circuitry, if the audio input matches one of a plurality of lexical sounds within the lexical sound data structure; and in response to the determination that the audio input does not match one of a plurality of lexical sounds within the lexical sound data structure, determining, by the control circuitry, that the received audio input is a non-lexical sound or an interjection.

11. A system for training a control system based on prior audio inputs, comprising:

control circuitry configured to:

receive an audio input, wherein the audio input comprises a non-lexical sound or an interjection;
receive one or more state change indications within a predefined period of time starting from the receipt of the audio input; and
in response to receiving one or more state change indications within the predefined period of time:
determine contextual information for the audio input at the time of the audio input; and
store the audio input, the contextual information, and the one or more state change indications in an associative data structure in a memory.

12. The system of claim 11, wherein the control circuitry is further configured to:
receive a subsequent audio input, wherein the subsequent audio input comprises a non-lexical sound or an interjection;
determine contextual information for the subsequent audio input at the time of the subsequent audio input; and
in response to a determination that (a) the subsequent audio input matches the stored audio input and (b) the contextual information for the subsequent audio input matches the stored contextual information of the audio input:
store a match association for the subsequent audio input to the audio input in the associative data structure, wherein the match association comprises a confidence factor of the match association; and
adjust the confidence factor of the match association.

13. The system of claim 12, wherein control circuitry is further configured to, when in response to the determination that (a) the subsequent audio input matches the stored audio input and (b) the contextual information for the subsequent audio input matches the stored contextual information of the audio input, to:
determine whether the confidence factor of the match is greater than a preconfigured confidence level; and
in response to determining the confidence factor of the match is greater than a preconfigured confidence level, execute one or more functions based on the stored one or more state change indications.

14. The system of claim 13, wherein:
execute one or more functions comprises providing a confirmatory function;
and the control circuitry is further configured to:
receive a selection of the confirmatory function; and
store the confirmatory function, the subsequent audio input, and the contextual information for the subsequent audio input in the associative data structure in the memory.

15. The system of claim 13, wherein:
execute one or more functions comprises transmitting an instruction to a network-connected device, the instruction based on the stored one or more state change indications;
and the control circuitry is further configured to store the one or more functions, the subsequent audio input, and the contextual information for the subsequent audio input in the associative data structure in the memory.

16. The system of claim 11, wherein control circuitry is further configured to, when determining contextual information for the audio input, to:
parse the audio input into one or more audio components;
compare each component, of the one or more audio components, to a plurality of audio signal profiles, wherein the audio signal profiles comprise corresponding contextual information;
determine whether one of the one or more components matches one of the plurality of audio signal profiles; and
in response to the determination that one of the one or more components matches one of the plurality of audio signal profiles, assign the corresponding contextual information of the matching audio signal profile to the contextual information of the audio input.

17. The system of claim 11, wherein:
the audio input further comprises metadata including corresponding contextual information of the audio input; and
and the control circuitry is further configured, when determining contextual information for the audio input, is further configured to assign the corresponding contextual information of the audio input as the contextual information for the audio input.

18. The system of claim 11, wherein control circuitry is further configured to, when determining contextual information for the audio input, to:
receive contextual information associated with the audio input from a contextual data structure; and
assign the received contextual information to the audio input as the contextual information for the audio input.

19. The system of claim 12, wherein control circuitry is further configured to, when adjusting the confidence factor of the match association, to:
determine statistical information associated with the match association; and
calculate the confidence factor by applying a mathematical operation to a previous confidence factor associated with the match association, wherein the mathematical operation utilizes the statistical information of the match association.

20. The system of claim 11, wherein control circuitry is further configured to, when receiving an audio input, wherein the audio input comprises a non-lexical sound or an interjection, to:
determine whether the audio input is a non-lexical sound or an interjection by:
compare, by the control circuitry, the received audio input to a lexical sound data structure;
determine, by the control circuitry, if the audio input matches one of a plurality of lexical sounds within the lexical sound data structure; and
in response to the determination that the audio input does not match one of a plurality of lexical sounds within the lexical sound data structure, determine that the received audio input is a non-lexical sound or an interjection.

* * * * *